US012172828B1

(12) United States Patent
Torrez

(10) Patent No.: US 12,172,828 B1
(45) Date of Patent: Dec. 24, 2024

(54) YARD DEBRIS TRASH CHUTE

(71) Applicant: Juan Alfredo Torrez, Phoenix, AZ (US)

(72) Inventor: Juan Alfredo Torrez, Phoenix, AZ (US)

(73) Assignee: Juan Alfredo Torrez, Phoenix, AZ (US)

( * ) Notice: Subject to any disclaimer, the term of this patent is extended or adjusted under 35 U.S.C. 154(b) by 248 days.

(21) Appl. No.: 17/831,312

(22) Filed: Jun. 2, 2022

Related U.S. Application Data

(60) Provisional application No. 63/216,121, filed on Jun. 29, 2021.

(51) Int. Cl.
*B65F 1/14* (2006.01)

(52) U.S. Cl.
CPC .......... *B65F 1/1415* (2013.01); *B65F 1/1468* (2013.01); *B65F 2240/138* (2013.01)

(58) Field of Classification Search
CPC . B65F 1/1415; B65F 1/1466; B65F 2240/138
USPC .......................................................... 248/97
See application file for complete search history.

(56) References Cited

U.S. PATENT DOCUMENTS

| | | | | |
|---|---|---|---|---|
| 999,406 | A * | 8/1911 | Skelton | B65B 67/12 248/97 |
| 3,756,548 | A * | 9/1973 | Santarelli | B65F 1/1415 248/129 |
| 4,442,567 | A * | 4/1984 | Pravettone | A47L 13/52 280/47.35 |
| 5,031,277 | A * | 7/1991 | Coker | B65F 1/1468 15/257.3 |
| 5,048,778 | A * | 9/1991 | Wright | B65B 67/12 141/391 |
| 6,082,574 | A * | 7/2000 | Johnson | B65F 1/06 220/23.91 |
| 7,014,199 | B2 * | 3/2006 | Hendzel | B62B 3/106 280/47.35 |
| 7,222,825 | B2 * | 5/2007 | Gilbert | B65F 1/1415 141/391 |
| 8,104,778 | B1 * | 1/2012 | Rojas | B62B 1/14 280/47.131 |
| 8,479,780 | B2 * | 7/2013 | Fernandez | B65F 1/1468 141/10 |
| 10,017,198 | B1 * | 7/2018 | Stamper | B62B 1/20 |

* cited by examiner

*Primary Examiner* — Anita M King
(74) *Attorney, Agent, or Firm* — Plager Schack LLP; Mark H. Plager, Esq.; Kara Verryt, Esq.

(57) ABSTRACT

A device for collecting and storing yard debris prior to disposal may be a yard debris trash chute, wherein the trash chute includes a drum supported by a support structure. The drum may have an open bottom and a beveled or flared top end and may be sized to accommodate insertion of a bag therein. The support structure may include a frame with a bag holder extending therefrom, wherein the bag holder is positioned to support an end of the bag extending outward from the open bottom end of the drum.

11 Claims, 4 Drawing Sheets

YARD DEBRIS TRASH CHUTE

RELATED APPLICATION

This application claims priority to provisional patent application U.S. Ser. No. 63/216,121 filed on Jun. 29, 2021, the entire contents of which is herein incorporated by reference.

BACKGROUND

The embodiments described herein relate generally to yard tools and, more particularly, to a yard debris trash chute.

Picking up yard debris is a time consuming and tedious task. With standard trashcans, a user must place a trash bag into the trashcan, fill it, and then lift it out for disposal. Unfortunately, trash bags filled with yard debris tend to be quite heavy, making it difficult or impossible for some users to lift the filled bag out of the trash can.

Therefore, what is needed is a device for easily collecting yard debris in a trash bag without requiring that the trash bag be lifted out of a trash can.

SUMMARY

Some embodiments of the present disclosure include a device for collecting and storing yard debris prior to disposal may be a yard debris trash chute, wherein the trash chute includes a drum supported by a support structure. The drum may have an open bottom and a beveled or flared top end and may be sized to accommodate insertion of a bag therein. The support structure may include a frame with a bag holder extending therefrom, wherein the bag holder is positioned to support an end of the bag extending outward from the open bottom end of the drum.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a yard debris trash chute and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

Figure 1:
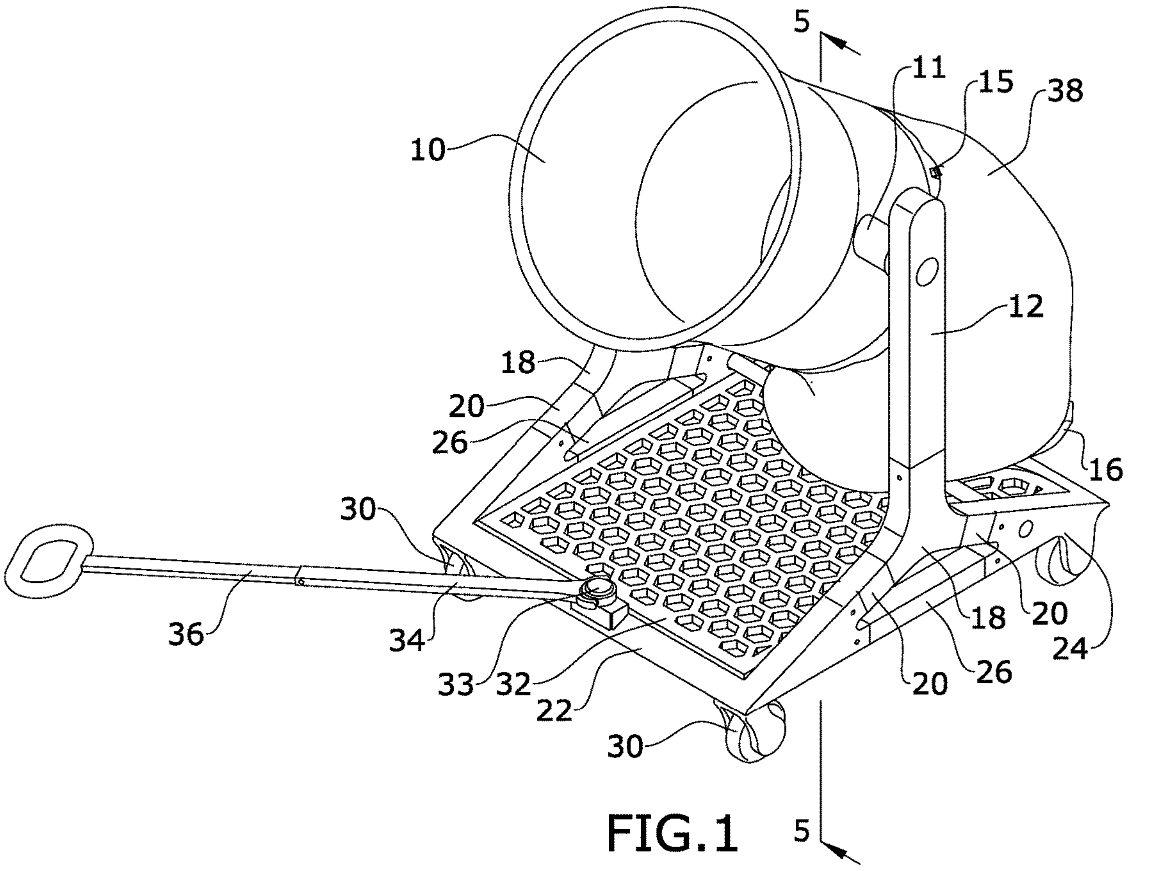
FIG. 1 is a perspective view of one embodiment of the present disclosure.
Figure 2:
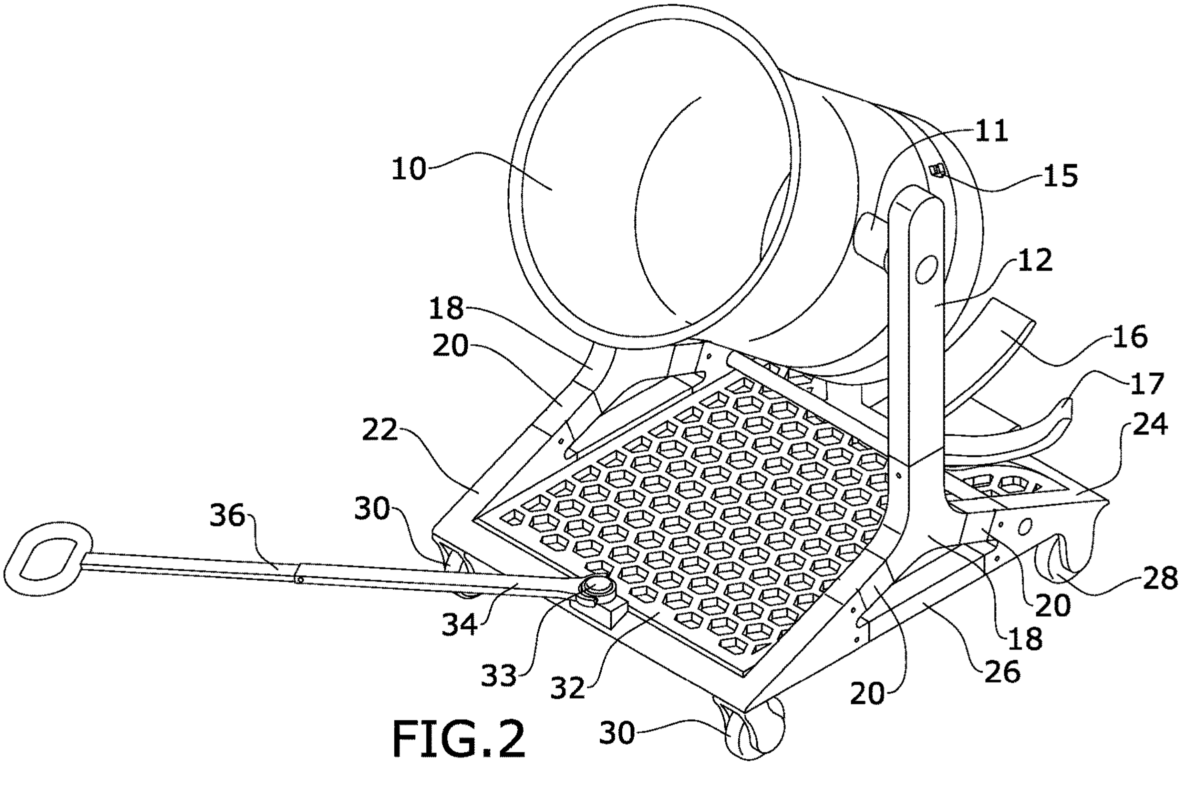
FIG. 2 is a perspective view of one embodiment of the present disclosure.
Figure 3:
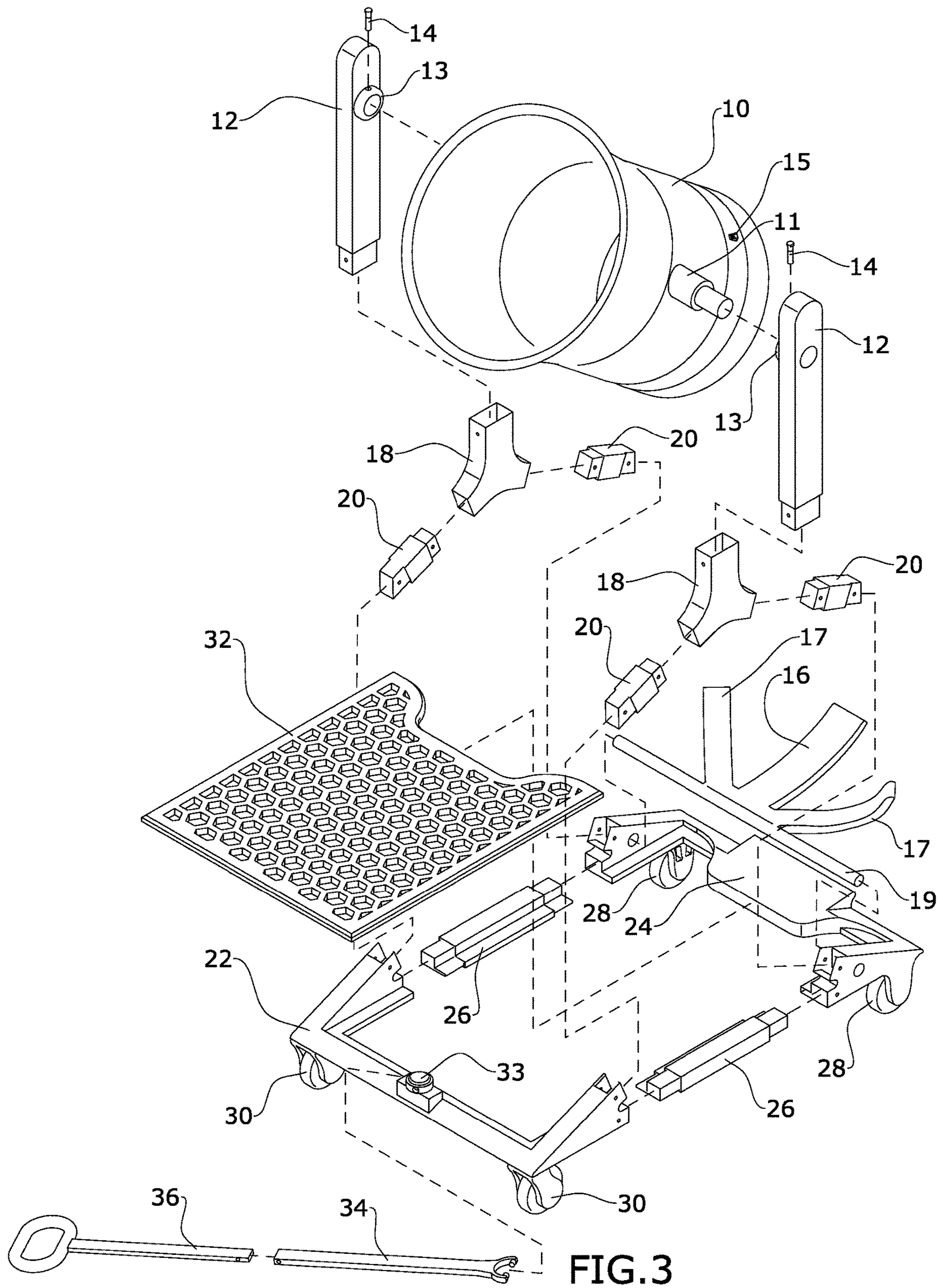
FIG. 3 is an exploded view of one embodiment of the present disclosure.
Figure 4:
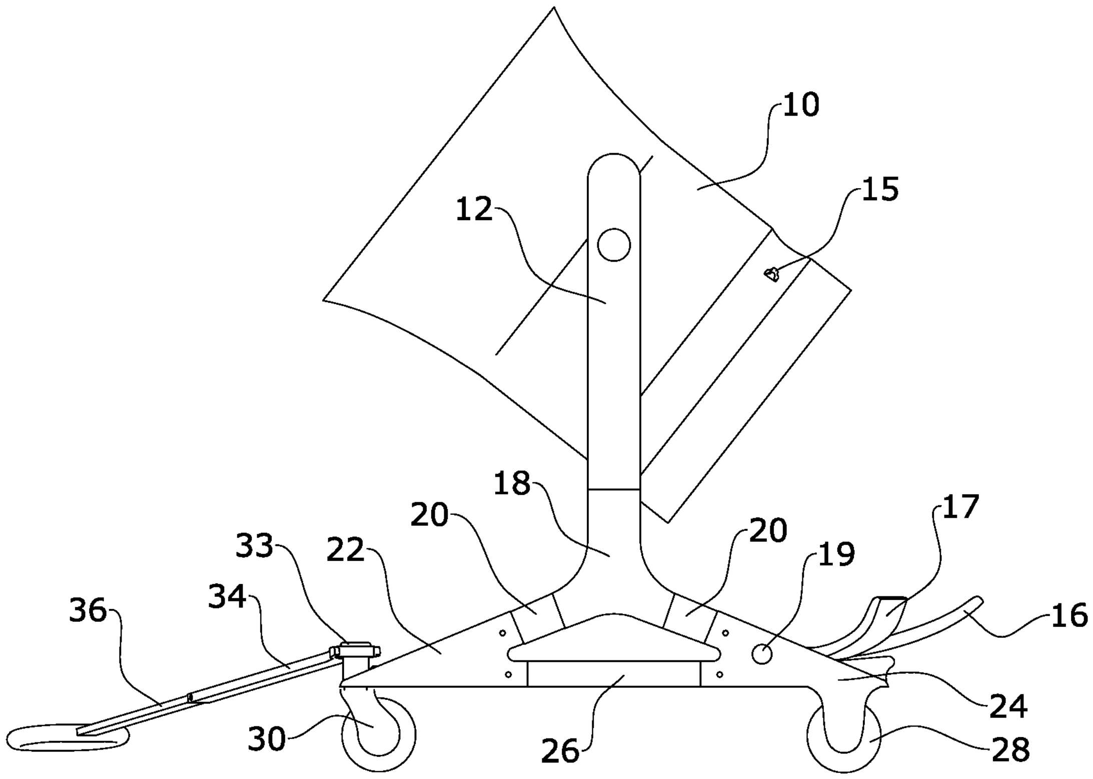
FIG. 4 is a side view of one embodiment of the present disclosure.
Figure 5:
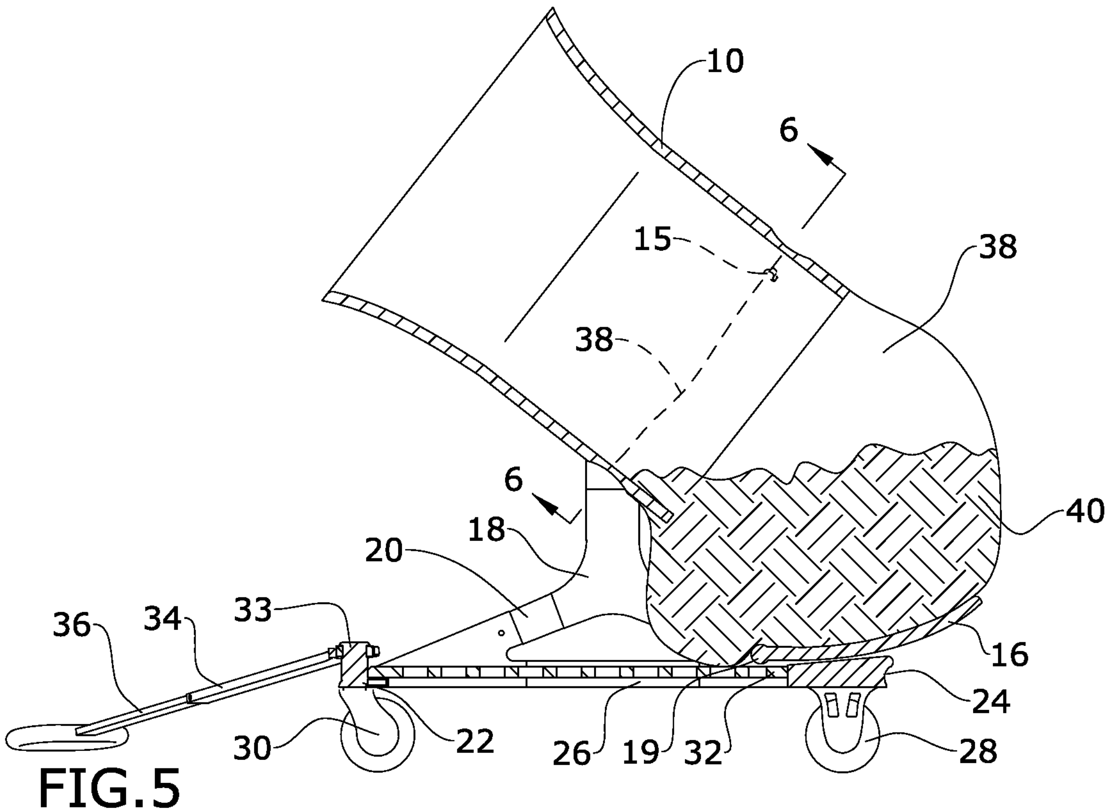
FIG. 5 is a section view of one embodiment of the present disclosure, taken along line 5-5 in FIG. 1.
Figure 6:
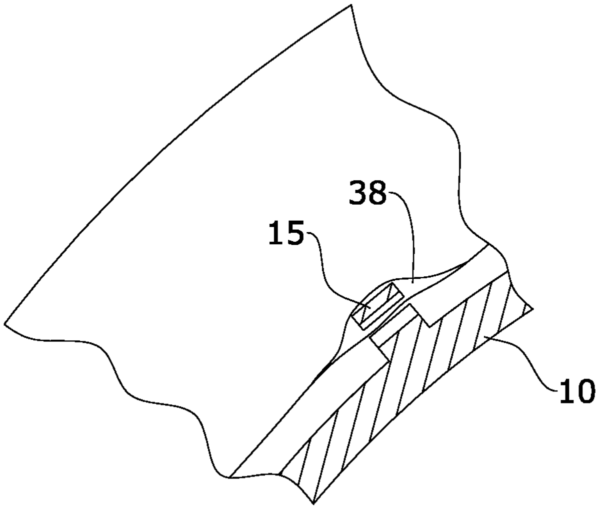
FIG. 6 is a section view of one embodiment of the present disclosure, taken along line 6-6 in FIG. 5.
Figure 7:
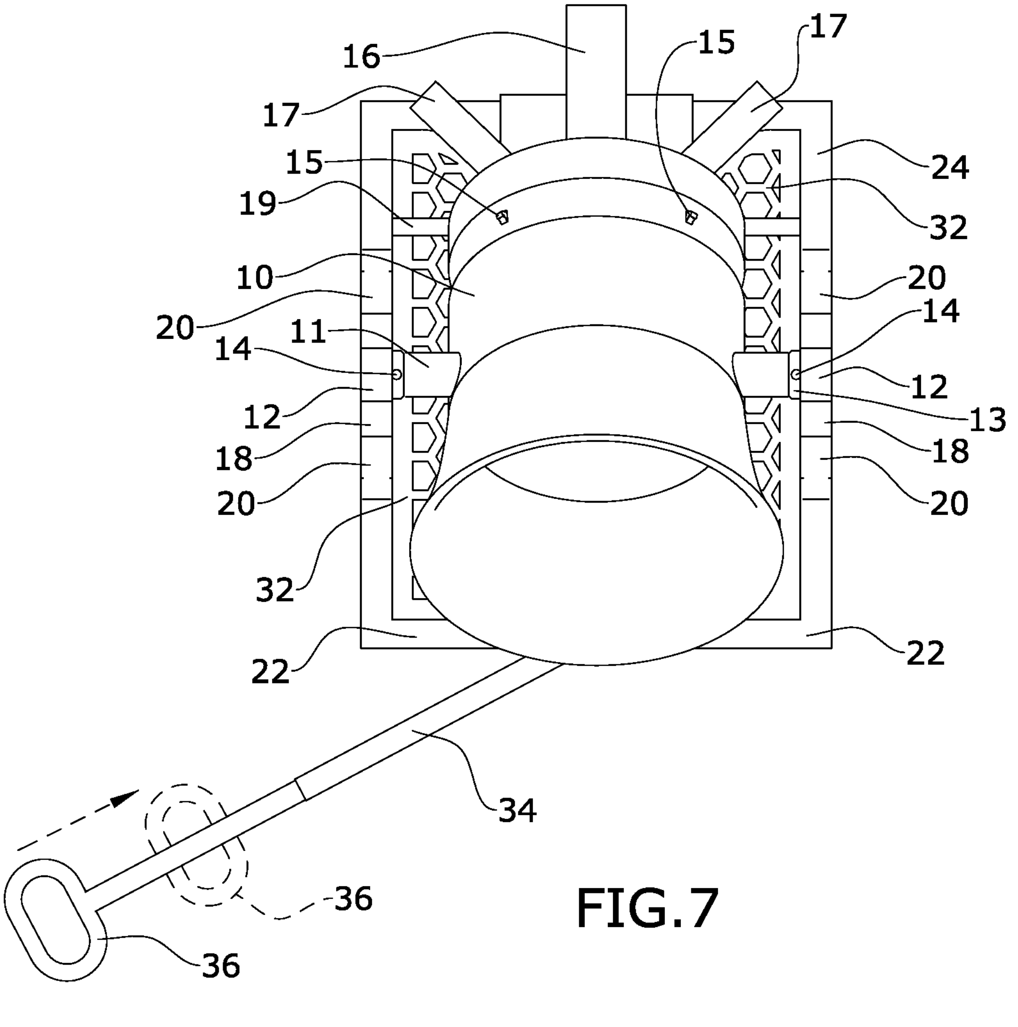
FIG. 7 is a top view of one embodiment of the present disclosure, showing the handle 36 adjustment.

By way of example, and referring to FIGS. 1-6, some embodiments of the present disclosure include a device for collecting and storing yard debris prior to disposal, the device comprising a yard debris trash chute. In embodiments, the yard debris trash chute may comprise a drum 10 supported by a support structure, wherein the drum 10 has an open bottom and is sized to accommodate placement of a bag 38 thereon. As shown in the Figures, the drum 10 may include a plurality of bag securing devices 15 extending from an outer surface of the drum 10 proximate to the open bottom. In embodiments, the plurality of bag securing devices 15 may each be a member selected from the group consisting of a nipple, a hook, a clip, and any other known structure suitable for securing the opening of the bag 38 to the exterior of the drum 10. For example, in the case of a bag 38 with a drawstring, the use of hooks may be desired, wherein the hooks simply hook onto the drawstring. For bags 38 without drawstrings, the use of clips, such as any clip devices that can squeeze the top of the bag 38, may be desired.

In embodiments, the drum 10 may have a beveled or flared top end. The support structure may include a bag holder 16 or cradle extending upward from a top surface thereof, wherein the bag holder 16 is sized and positioned to support an end of the bag 38 extending outward from the open bottom of the drum 10.

As shown in the Figures, the support structure may comprise a base and a pair of drum supports 12 extending upward therefrom, wherein the drum 10 is supported or suspended between top ends of the pair of drum supports 12. In some embodiments, the drum 10 may be supported at a fixed angle between the pair of drum supports such that the drum 10 is neither parallel nor perpendicular to the ground during use. In other embodiments, the drum 10 may be pivotably supported between the pair of drum supports 12, such that the angle of the drum 10 with respect to the drum supports 12 may vary. The drum 10 may be mounted to the drum supports 12 using any suitable connection means and, in some embodiments, a pair of drum pegs 11 may extend outward from an outer surface of a top end of the drum 10 and each of the pair of drum supports 12 may include a protrusion with a support notch 13 extending therein. The protrusion may extend outward from an inner surface toward a top end of the drum support 12, wherein each support notch 13 is sized to accommodate insertion of a drum peg 11 therein. In embodiments where the drum 10 is supported at a fixed angle, a drum pin 14 may extend into the protrusion and abut or extend into the drum peg 11 to secure the drum 10 at the desired angle.

In embodiments, the base of the support structure may comprise a plurality of interconnected base pieces that together form a frame and a platform, such as a grate 32, may be supported by the frame. The plurality of base pieces may comprise a front base 22, a rear base 24 and two center bases 26 attaching a first side of the rear base 24 to a first side of the front base 22 and a second side of the rear base 24 to a second side of the front base 22. In some embodiments, such as those shown in the figures, the frame is substantially rectangular, and thus, the front base 22 is substantially parallel to the rear base 24 and the center bases 26 are substantially parallel to each other.

As shown in the Figures, the drum supports 12 may extending upwards from the frame. For example, the front base 22 may comprise a pair of angled protrusions, each designed to engage with a respective extension 20. Similarly, the rear base 24 may comprise a pair of angled protrusions, each designed to engage with a respective extension. A distal end of each extension 20 may be engaged with a respective triconnector 18, wherein an upward extending edge of the triconnector 18 may be engaged with a proximal end of the drum support 12. In other embodiments, the drum support 12 may be fixedly attached to a singular pieced frame.

As mentioned above, the support structure may also comprise a bag holder 16. As shown in, for example, FIG. 3, the bag holder 16 may comprise a crossbar 19 and a plurality of curved arms 17 extending outward from a first side of the crossbar 19. For example, three curved arms 17 may extend outward and slightly upward from the crossbar 19. As shown in the Figures, the crossbar 19 may be operatively attached to the rear base 24. More specifically, the crossbar 19 may be suspended between the pair of angled protrusions on the rear base 24. As shown in the Figures, the rear base 24 may comprise a central portion with a larger width positioned vertically below the bag holder 16 during use of the device of the present disclosure.

The support structure may further comprise a plurality of wheels or casters attached to a bottom surface thereof. For example, and as shown in the Figures, a pair of casters, such as swivel casters 30, may be attached to a bottom surface of the front base 22, and a second pair of casters, such as rigid casters 28, may be attached to a bottom surface of the rear base 24. A handle 36 may be operatively attached to the support structure. For example, the handle 26 may be operatively attached to a handle connector 33 extending from the front base 22. In a particular embodiment, the handle 26 may be attached to a handle base 34, which may be attached, such as pivotably attached, to the handle connector 33. As such, the support structure may function as a cart designed to easily pull the drum 10 around to reposition it during use.

The components of the device of the present disclosure may be made of any suitable or desired materials. In some embodiments, the components may comprise a rigid material such as steel, any other lightweight metal, plastic, wood, or the like.

To use the yard debris trash chute of the present disclosure, a user may place a trash bag 38 onto the drum 10 by sliding the bag 38 up over the bottom of the drum 10 and securing it using the bag securing devices 15. Debris 40 may then be added to the drum 10 and, thus, the trash bag 38. As the trash bag 38 is filled, it will be supported by the bag holder 16. The user may wheel the yard debris trash chute around the yard, as needed, by simply pulling the handle 36 and walking. When the trash bag 38 is full, the bag 38 may simply be pulled off of the bottom of the drum 10 and disposed of, as desired.

While the device of the present disclosure is described above as being used to collect yard waste, it is not limited to such intended use. Rather, it may be used anywhere that clean up or collection is necessary.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A device for collecting and storing yard debris prior to disposal, the device comprising:

a drum supported by a support structure, the support structure comprising a base and a pair of drum supports extending upward therefrom, wherein:

the drum has an open bottom end and is sized to accommodate placement of a bag thereon;

the drum includes a plurality of bag holder devices extending from an outer surface of the drum proximate to the open bottom;

the support structure comprises a bag holder extending from a top surface thereof; and the bag holder is configured to support an end of the bag extending outward from the open bottom end of the drum;

the drum is suspended between top ends of the pair of drum supports;

the drum comprises a pair of drum pegs extending outward from an outer surface of a top end thereof;

each of the pair of drum supports includes a protrusion with a support notch extending therein; and each support notch is sized to accommodate insertion of a drum peg of the pair of drum pegs.

2. The device of claim 1, wherein the drum is supported at a fixed angle between the pair of drum supports.

3. The device of claim 1, further comprising a drum pin extending into each protrusion and into the drum peg to secure the drum at a desired angle with respect to the pair of drum supports.

4. The device of claim 1, wherein the base comprises:

a plurality of interconnected base pieces that together form a frame; and a platform supported by the frame.

5. The device of claim 4, wherein the plurality of interconnected base pieces comprise a front base, a rear base, and two center bases attaching a first side of the rear base to a first side of the front base and a second side of the rear base to a second side of the front base.

6. The device of claim 4, wherein:

the front base comprises a pair of angled protrusions, each designed to engage with a respective extension;

the rear base comprises a pair of angled protrusions, each designed to engage with a respective extension;

a distal end of each extension is engaged with a respective triconnector; and an upward extending edge of the triconnector is engaged with a proximal end of a drum support of the pair of drum supports.

7. The device of claim 1, wherein the bag holder comprises a crossbar with a plurality of curved arms extending outward from a first side thereof.

8. The device of claim 1, further comprising:

a plurality of casters attached to a bottom surface of the support structure; and a handle extending outward from the support structure.

9. The device of claim 1, wherein each bag securing device of the plurality of bag securing devices is a member selected from the group consisting of a hook, a nipple, and a clip.

10. A device for collecting and storing yard debris prior to disposal, the device comprising:

a drum supported by a support structure, the support structure comprising a base and a pair of drum supports extending upward therefrom, wherein:

the drum has an open bottom end and is sized to accommodate placement of a bag thereon;

the drum includes a plurality of bag holder devices extending from an outer surface of the drum proximate to the open bottom;

the support structure comprises a bag holder extending from a top surface thereof;

the bag holder is configured to support an end of the bag extending outward from the open bottom end of the drum;

the drum is suspended between top ends of the pair of drum supports;

the base comprises:

a plurality of interconnected base pieces that together form a frame; and a platform supported by the frame;

the front base comprises a pair of angled protrusions, each designed to engage with a respective extension;

the rear base comprises a pair of angled protrusions, each designed to engage with a respective extension;

a distal end of each extension is engaged with a respective triconnector; and an upward extending edge of the triconnector is engaged with a proximal end of a drum support of the pair of drum supports.

11. A device for collecting and storing yard debris prior to disposal, the device comprising:

a drum supported by a support structure, wherein:

the drum has an open bottom end and is sized to accommodate placement of a bag thereon;

the drum includes a plurality of bag holder devices extending from an outer surface of the drum proximate to the open bottom;

the support structure comprises a bag holder extending from a top surface thereof;

the bag holder is configured to support an end of the bag extending outward from the open bottom end of the drum; and the bag holder comprises a crossbar with a plurality of curved arms extending outward from a first side thereof.

* * * * *